US009080483B2

(12) United States Patent
LaRose, Jr. et al.

(10) Patent No.: US 9,080,483 B2
(45) Date of Patent: Jul. 14, 2015

(54) SYSTEM AND METHOD FOR PARTICULATE FILTER REGENERATION

(71) Applicant: GM Global Technology Operations LLC, Detroit, MI (US)

(72) Inventors: Thomas LaRose, Jr., Howell, MI (US); Christopher Whitt, Howell, MI (US); Christopher C. Swoish, Lapeer, MI (US); Douglas Christopher Sarsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/672,135

(22) Filed: Nov. 8, 2012

(65) Prior Publication Data

US 2014/0123628 A1    May 8, 2014

(51) Int. Cl.

| F01N 3/00 | (2006.01) |
|---|---|
| F01N 3/02 | (2006.01) |
| F01N 3/10 | (2006.01) |
| F01N 3/20 | (2006.01) |
| F01N 3/025 | (2006.01) |
| F01N 9/00 | (2006.01) |
| F01N 13/00 | (2010.01) |

(52) U.S. Cl.
CPC .............. *F01N 3/025* (2013.01); *F01N 3/0253* (2013.01); *F01N 3/2066* (2013.01); *F01N 9/002* (2013.01); *F01N 13/009* (2014.06); *F01N 2430/085* (2013.01); *F01N 2610/03* (2013.01); *F01N 2900/08* (2013.01); *F01N 2900/1606* (2013.01); *Y02T 10/24* (2013.01); *Y02T 10/47* (2013.01)

(58) Field of Classification Search
USPC ..................................... 60/274, 277, 297, 311
See application file for complete search history.

(56) References Cited

U.S. PATENT DOCUMENTS

| 2007/0130921 A1 | 6/2007 | Yezerets et al. | |
| 2011/0252770 A1* | 10/2011 | Heibel et al. | .................... 60/274 |

\* cited by examiner

*Primary Examiner* — Audrey K Bradley
*Assistant Examiner* — Dapinder Singh
(74) *Attorney, Agent, or Firm* — Cantor Colburn LLP

(57) ABSTRACT

In one exemplary embodiment of the invention, a method for controlling regeneration for an exhaust system of an internal combustion engine, wherein the exhaust system includes a particulate filter is provided, where the method includes determining a mass flow rate of oxygen received from the internal combustion engine, determining a particulate mass within the particulate filter, determining a desired particulate burn rate based on the mass flow rate of oxygen and the particulate mass and determining a current particulate burn rate. The method also includes determining a correction value based on the desired particulate burn rate and the current particulate burn rate, determining a temperature set point for exhaust gas entering the particulate filter based on the correction value, an engine speed and an engine load and communicating a signal, from a controller, to control a parameter for a regeneration system based on the determined temperature set point.

20 Claims, 3 Drawing Sheets

SYSTEM AND METHOD FOR PARTICULATE FILTER REGENERATION

FIELD OF THE INVENTION

The subject invention relates to internal combustion engines, and, more particularly, to exhaust aftertreatment systems for internal combustion engines.

BACKGROUND

An engine control module of an internal combustion engine controls the mixture of fuel and air supplied to combustion chambers of the engine. After the air/fuel mixture is ignited, combustion takes place and the combustion gases exit the combustion chambers through exhaust valves. The combustion gases are directed by an exhaust manifold to a catalyst (or "catalytic converter") and/or other exhaust aftertreatment components.

During engine operation, certain exhaust aftertreatment components are configured to remove selected regulated constituents from the exhaust gas. An exemplary component is a particulate filter configured to remove carbon particles or particulates that result from incomplete combustion of a hydrocarbon fuel, also referred to as particulates, from the exhaust gas. An exemplary particulate filter is configured to remove a selected amount of particulates and periodically burn off the accumulated particulates through a regeneration process. Regeneration and removal of excess particulates prevents excessive backpressure for the internal combustion engine, which can lead to repair and maintenance issues. In some cases, controlling the burn rate of particulates and corresponding temperature within the filter can be difficult, as a burn rate that is too high may cause a thermal runaway condition and a burn rate that is too low may cause an extended time for the regeneration process. The time it takes to perform a regeneration process should also be reduced as much as possible, as the regeneration process can adversely affect fuel economy of the engine.

SUMMARY OF THE INVENTION

In one exemplary embodiment of the invention, a method for controlling regeneration for an exhaust system of an internal combustion engine, wherein the exhaust system includes a particulate filter is provided, where the method includes determining a mass flow rate of oxygen received from the internal combustion engine, determining a particulate mass within the particulate filter, determining a desired particulate burn rate based on the mass flow rate of oxygen and the particulate mass and determining a current particulate burn rate. The method also includes determining a correction value based on the desired particulate burn rate and the current particulate burn rate, determining a temperature set point for exhaust gas entering the particulate filter based on the correction value, an engine speed and an engine load and communicating a signal, from a controller, to control a parameter for a regeneration system based on the determined temperature set point.

In another exemplary embodiment of the invention, a system includes a particulate filter coupled to a conduit that receives an exhaust gas from an internal combustion engine and a controller coupled to an oxygen mass flow sensor, the controller configured to perform a method. The method includes determining a mass flow rate of oxygen received from the internal combustion engine, determining a particulate mass within the particulate filter, determining a desired particulate burn rate based on the mass flow rate of oxygen and the particulate mass, determining a current particulate burn rate, determining a correction value based on the desired particulate burn rate and the current particulate burn rate, determining a temperature set point for exhaust gas entering the particulate filter based on the correction value, an engine speed and an engine load and communicating a signal to control a parameter for a regeneration system based on the determined temperature set point.

The above features and advantages and other features and advantages of are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION OF THE EMBODIMENTS

Figure 1:
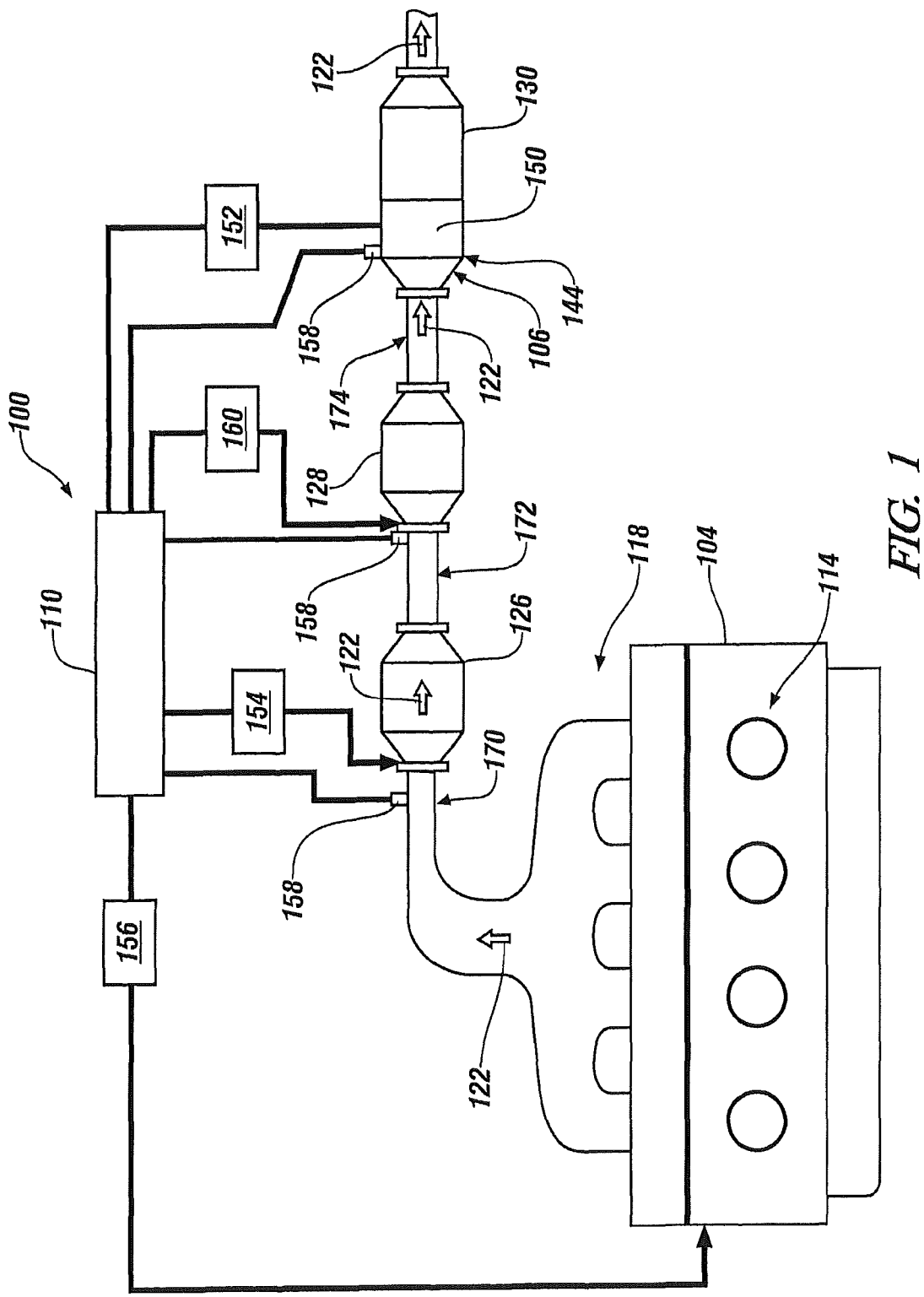
FIG. 1 illustrates an exemplary internal combustion engine including an exemplary exhaust aftertreatment system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or module may include one or more sub-controllers or sub-modules.

In accordance with an exemplary embodiment of the invention, FIG. 1 illustrates an exemplary internal combustion engine 100, in this case an in-line four cylinder engine, including an engine block and cylinder head assembly 104, an exhaust system 106, and a control module 110 (also referred to as "controller"). The internal combustion engine 100 may be a diesel or spark ignition engine. Coupled to the engine block and cylinder head assembly 104 is an exhaust manifold 118. In addition, the engine block and cylinder head assembly 104 includes cylinders 114 wherein the cylinders 114 receive a combination of combustion air and fuel supplied from a fuel system 156. The combustion air/fuel mixture is combusted resulting in reciprocation of pistons (not shown) located in the cylinders 114. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The combustion of the air/fuel mixture causes a flow of exhaust gas 122 through the exhaust manifold 118 and into the exhaust system 106.

The exhaust gas 122 flows through the exhaust system 106 for the removal or reduction of exhaust gas constituents and is then released into the atmosphere. The exhaust system 106 may include catalyst devices, such as oxidation catalyst ("OC") device 126 and selective catalytic reduction ("SCR") device 128, as well as a particulate filter ("PF") 130. Fluid communication between the catalyst devices is provided by passages or conduits 170. The OC device 126 may include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits or passages. The oxidation catalyst compound may be applied as a wash coat and may contain platinum group metals such as platinum (Pt), palladium (Pd), rhodium (Rh) or other suitable oxidizing catalysts. The SCR device 128 may also include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate can include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 122 in the presence of a reductant such as ammonia ($NH_3$). An $NH_3$ reductant may be supplied from a fluid supply 160 (reductant supply) and may be injected into the exhaust gas 122 at a location upstream of the SCR device 128 using an injector. The reductant may be in the form of a gas, a liquid, or an aqueous urea solution and may be mixed with air in the injector to aid in the dispersion of the injected spray.

The PF 130 may be disposed downstream of the SCR device 128. The PF 130 operates to filter the exhaust gas 122 of carbon and other particulates. In embodiments, the PF 130 may be constructed using a ceramic wall flow monolith filter that is wrapped in an intumescent mat or other suitable support that expands when heated, securing and insulating the filter. The filter may be packaged in a shell or canister that is, for example, stainless steel, and that has an inlet and an outlet in fluid communication with exhaust gas conduits. The ceramic wall flow monolith filter may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 122 entering the filter through the inlet ends of the inlet passages is forced to migrate through adjacent longitudinally extending walls to the outlet passages. It is through this exemplary wall flow mechanism that the exhaust gas 122 is filtered of carbon (soot) and other particulates. The filtered particulates are deposited on the longitudinally extending walls of the inlet passages and, over time, will have the effect of increasing the exhaust gas backpressure experienced by the internal combustion engine 100. It should be understood that the ceramic wall flow monolith filter is merely exemplary in nature and that the PF 130 may include other filter devices such as wound or packed fiber filters, open cell foams, sintered metal fibers, etc. It should also be noted that the arrangement and number of the exhaust system devices may vary, where the devices include the OC 126, SCR device 128 and PF 130. In addition, other devices may be includes in the system in addition to the depicted devices, while some of the depicted exhaust devices may be removed in some embodiments.

The accumulation of particulate matter within the PF 130 is periodically cleaned, or regenerated to reduce backpressure. Regeneration involves the oxidation or burning of the accumulated carbon and other particulates (also referred to as "soot") in what is typically a high temperature (e.g., at or above 600° C.) environment. In an embodiment, an elevated soot level is sensed in the PF 130 and a regeneration process may be performed. In an embodiment, the control module 110 determines loading of soot in the PF 130 by a measurement of pressure or another parameter, where the soot load may be represented by a soot mass parameter. The regeneration process may involve several components and have one or more stages. In one embodiment, the regeneration process includes an introduction of excess thermal energy into the exhaust aftertreatment system 106 by introducing fuel (hydrocarbons or HC) via an injector, such as hydrocarbon injector ("HCI") 154 directly into the exhaust gas 122 as it flows into catalysts, such as OC device 126 and SCR device 128. A selected amount of fuel is directed from the HCI 154 into the exhaust gas 122 and is oxidized in an exothermic reaction in the OC device 126, causing an increase in the temperature of the exhaust gas flow 122 into the PF 130. In the depicted embodiment, the control module 110 is coupled to the HCI 154 and is configured to control the amount of fuel to be directed into the exhaust gas flow 122, wherein the resulting increased exhaust gas temperature burns the trapped soot particles downstream within the PF 130.

In an embodiment, the regeneration process may include a heating device 150 controlled by the control module 110, wherein operation of the heating device 150 is based on sensed elevated soot levels. When the determined soot level achieves a threshold level (e.g., 5 grams/liter of soot) and the exhaust flow rate is within a desired range, the control module controls a current or voltage sent to the heating device 150 via a power source 152 to initiate the regeneration process. The heating device 150 may be constructed of any suitable material that is electrically conductive such as a wound or stacked metal monolith. The power source 152 is connected to an electrical system, such as a vehicle electrical system, and supplies electricity to the heating device 150. The heating device 150, when heated, increases the temperature of exhaust gas 122 passing through the heating device 150 and/or increases the temperature of portions of the PF filter 130 at or near the heating device 150. The duration of the regeneration process varies based upon the amount of particulate matter within the PF 130. In one aspect, current is only applied during an initial portion of the regeneration process. More specifically, the current is directed to the heating device 150 which heats the inlet of the PF 130 for a selected period (e.g., 1-2 minutes). The remainder of the regeneration process is achieved using the heat generated by combustion of particulate matter present in the PF 130.

Regeneration methods may also involve the injection of fuel into the exhaust gas flow 122 after the main combustion event within the cylinders 114. This process may be referred to as post-injection or late post-injection of fuel, wherein the fuel system 156 provides the selected amount of fuel into cylinders 114 to add to the exhaust gas flow 122 for combustion within the exhaust system 106. This method may be used as a sole means for regeneration in some cases and may be used in addition to other regeneration processes in other cases. Further, each the regeneration processes described herein may be used alone or in combination, depending upon system constraints. Referring back to post-injection, the he post-combustion injected fuel is oxidized in the OC device 126, in the exhaust system 106. The heat released from the oxidation increases the exhaust temperature, which burns the trapped soot particles in the PF 130. The control module 110 controls the amount of fuel provided by the fuel system 156 during the post-injection process. The selected amount of fuel injected for post-injection may be determined by the control module 110 based on various information, such as determined parameters (e.g., exhaust gas temperatures soot levels), component specifications and system configuration information. Component specifications may provide ideal operating conditions, such as a temperature operating range.

In an exemplary internal combustion engine 100, the control module 110 is in signal communication with the power source 152, HCI 154, the fuel system 156, sensors 158, and the exhaust system 106, wherein the control module 110 is configured to use various signal inputs to control various processes. In embodiments, the control module 110 is coupled to and configured to receive signal inputs from sensors 158 that includes information, such as temperature (intake system, exhaust system, engine coolant, ambient, etc.), pressure, exhaust flow rates, soot levels, NOx concentrations, exhaust gas constituencies (chemical composition) and other parameters. The control module 110 is configured to perform selected processes or operations based on the sensed parameters, such as regeneration processes based on elevated soot levels in the PF 130. Exemplary sensors 158 are positioned at an inlet of the OC device 126, an inlet of the SCR device 128 and proximate an inlet 144 of the PF 130.

In embodiments, the control module 110 controls at least one regeneration system, including but not limited to, the post-injection process via fuel system 156, HCI 154 and heating device 150, to control regeneration of the PF 130. Specifically, the control module may change a parameter relating to the regeneration process to control exhaust gas 122 temperature entering the PF 130, thus providing improved regeneration efficiency. The parameter changed may include, but is not limited to, changing a flow rate for the fuel system 156 or HCI 154 and changing the current or power sent to heating device 150. In an embodiment, the control module 110 hosts one or more programs that use parameters as inputs, such as determined parameters, to determine a target or set point temperature for exhaust gas 122 entering the PF 130 for regeneration. In embodiments, depending on system configuration, the exhaust gas temperature may be determined for any location between an outlet of the oxidation catalyst 126 and the PF inlet 144.

In an embodiment, the determined set point temperature is an exhaust gas temperature at which the regeneration process burns soot most efficiently, thereby providing shorter regeneration times while also reducing incidence of thermal runaway. In one embodiment, the set point temperature is determined and compared to a value measured by the sensor 158 proximate PF inlet 144. The control module 110 may then adjust components involved in the regeneration process, referred to as a regeneration system or regeneration components, such as fuel system 156, HCI 154 and heating device 150, to change the exhaust gas 122 temperature at the inlet 144. Embodiments provide an improved method for determining soot burn rate in the PF 130 during regeneration, where the improved burn rate determination also provides improved accuracy in determining the set point temperature for exhaust gas 122 at the inlet 144. In an embodiment, the improved burn rate determination provides a correction used in determining the set point temperature. In embodiments, the method and system provide flexibility in determining the burn rate for a variety of exhaust system 106 configurations. For example, the method and system may be used to determine a set point temperature for an exhaust system with a first distance between the PF 130 and engine block and cylinder head assembly 104 and sharing the same components as a second system with a second distance between the PF 130 and engine block and cylinder head assembly 104, where the second distance is greater than the first distance. In an embodiment, the system corrects the temperature set point to reach the same burn rate in each configuration, but the magnitude of the correction may be different in each case. Accordingly, an embodiment of the system and method provides improved flexibility and well as improved accuracy for determining regeneration set point temperatures for various configurations.

The determination of the regeneration set point temperature is used by a control module 110 to send control commands to regeneration system components, such as commands that control operation of the HCI 154, heating device 150, post-injection of fuel into cylinders 114 by a fuel injector, or a combination thereof. For example, a control command may change current provided to the heating device 150 based on the determined set point temperature and the measured temperature at the PF 130. The current may be changed by the control module 110 sending a signal that controls current from the power source 152. In another example, a control command may change hydrocarbon flow from an HCI 154 into the exhaust system 106 or fuel flow from the fuel system 156 into the cylinders 114 based on the determined set point temperature. The flow rate may be changed by the control module 110 sending a signal to change a position of a valve in fuel system 156 or HCI 154. Thus, the determined set point temperature including the correction provides improved accuracy which leads to improved regeneration efficiency and control of regeneration and associated system components.

Figure 2:
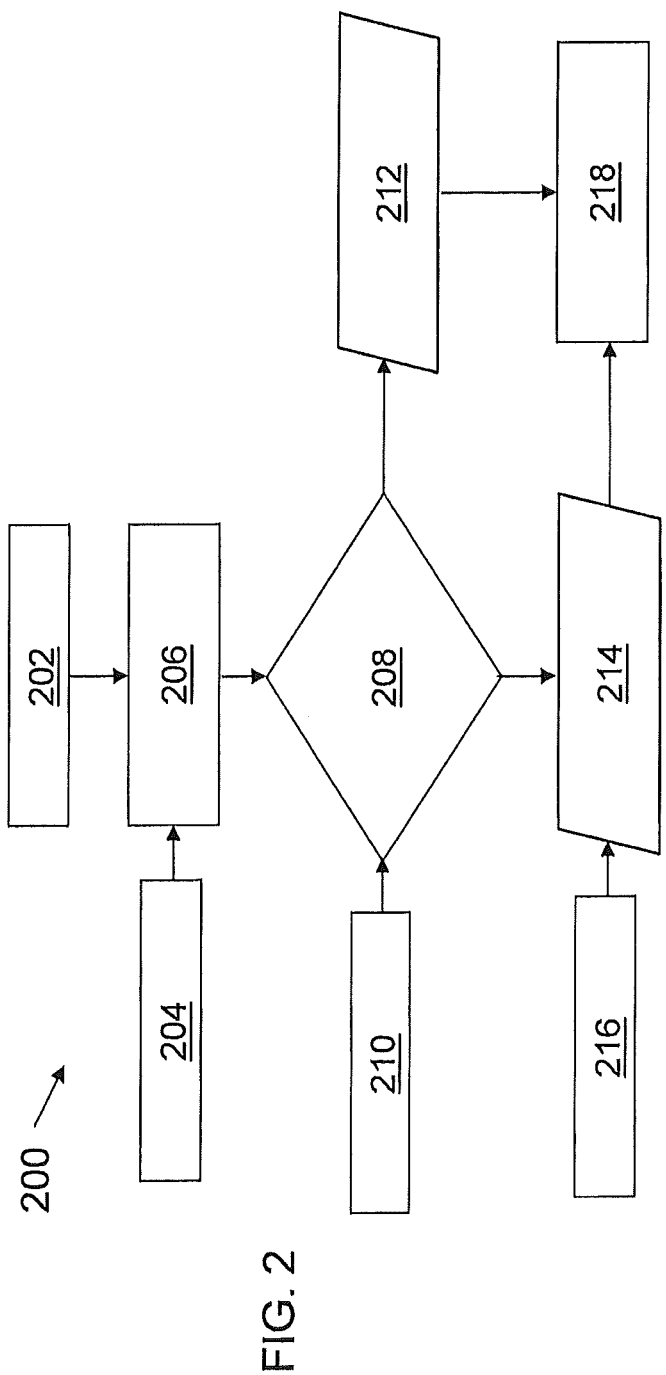
FIG. 2 is a diagram of an exemplary method and system for regeneration of a particulate filter in the exemplary internal combustion engine and associated exhaust system shown in FIG. 1.
Figure 3:
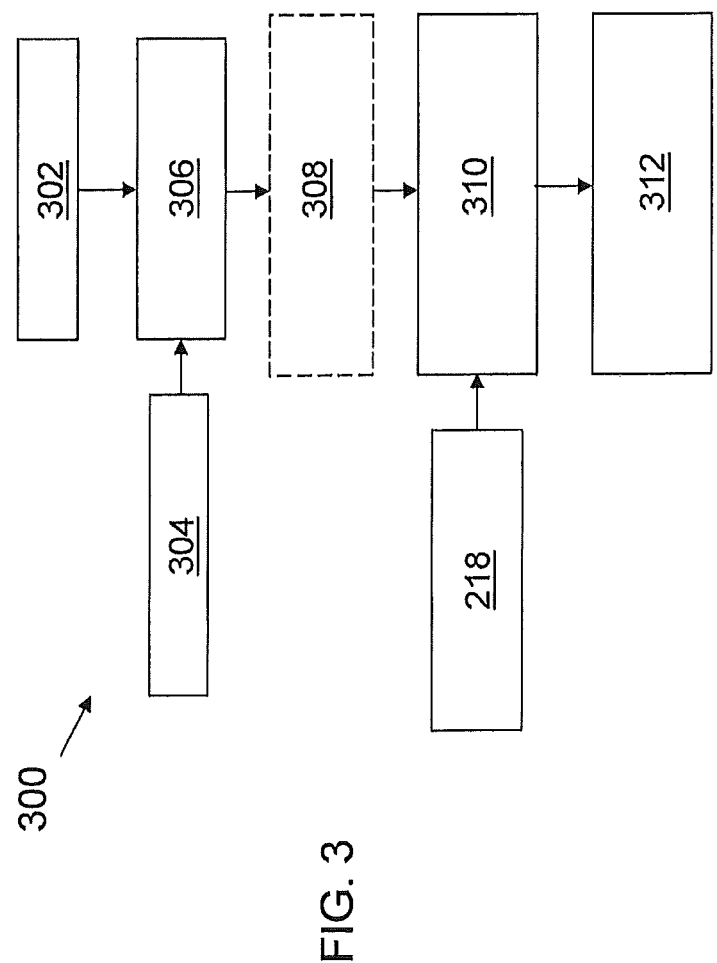
FIG. 3 is a diagram of an exemplary method and system for regeneration of a particulate filter in the exemplary internal combustion engine and associated exhaust system shown in FIG. 1.

FIG. 2 is a flow chart of an exemplary process 200 for regeneration in an exhaust aftertreatment system, such as exhaust system 106 (FIG. 1). The depicted flowcharts in FIGS. 2 and 3 illustrate the architecture, functionality, and operation of possible implementations of systems and methods according to various embodiments. It should be noted that, in some implementations, the functions noted in the blocks may occur out of the order shown. Further, additional blocks may be added to or removed from the process in certain embodiments to accommodate certain applications. Parameters determined by and used in the process 200 may be determined by any suitable method, such as modeling, equations, logged data, sensor measurements or any combination thereof. In block 202, an oxygen mass flow rate received from an internal combustion engine is determined. In block 204, a particulate mass within a particulate filter is determined. The particulate mass may be measured directly or inferred from other measurements, such as by using pressure measurements that provide a backpressure value that is used to infer particulate mass. In an embodiment, the oxygen mass flow rate from block 202 and the particulate mass from block 204 are determined and received as inputs to block 206 where the inputs are used to determine a desired particulate burn rate. The desired particulate burn rate is a burn rate at which efficient regeneration occurs. In an embodiment, the time for an efficient regeneration process may be reduced to a shorter period to avoid and reduce the probability of adversely affecting operator experience. In addition, the reduced regeneration period provides regeneration that does not exceed a certain temperature for exhaust components, above which temperature operation may cause metal fatigue and wear of components such as oxidation or other high temperature degradation processes. In one embodiment, the block 206 includes using the inputs for a look-up table that provides a desired burn rate based on the inputs. The data in the look-up table may be provided by modeling and/or by analyzing logged data from testing and determining a desired burn rate based on a variety of operating conditions and configurations.

With continued reference to FIG. 2, in block 208, a type of correction value is determined, where the correction value may be based on a deviation or a ratio of the desired burn rate from block 206 as well as a current particulate burn rate in block 210. In block 212, in an embodiment utilizing the ratio method, the correction ratio value provides a correction to the set point temperature based on a ratio of the desired burn rate divided by the current burn rate. In block 214, in an embodiment using the deviation method, the difference between the desired burn rate and current burn rate is determined, where the difference or deviation value provides a correction to the set point temperature. In block 216, an embodiment determines and provides an exhaust mass flow rate as an input to the block 214, where the exhaust mass flow rate is also used as an input to determine the correction deviation value. In an embodiment, the exhaust mass flow is calculated from the Mass Airflow sensor (MAF) which measures fresh air coming into the engine and the amount of fuel injected into the engine. In an embodiment, the exhaust mass flow rate determination provides flexibility to determine the appropriate conditions (e.g., burn rate, temperature) for the regeneration process. The correction ratio value from block 212 or the deviation value from block 214 is then provided as an input to block 218. In block 218, the correction value (ratio or deviation-based) is received as an input to correct and determine the exhaust gas set point temperature, where the set point temperature is used to provide a corresponding signal from a controller to control a parameter for the regeneration system to achieve the set point temperature.

FIG. 3 is a flow chart of an exemplary process 300 for regeneration in an exhaust aftertreatment system, such as exhaust system 106 (FIG. 1). In an embodiment, the process 300 may include parameter inputs from other processes, such as an input from block 218 from process 200. In block 302, a speed (RPM) of an internal combustion engine is determined. In block 304, a load or fueling rate (e.g., fuel per cylinder per combustion event) is determined for the internal combustion engine. In block 306, the parameters from blocks 302 and 304 are received and used to determine a base set point temperature for exhaust gas entering the PF 130. In block 308, filters, corrections and/or compensation factors may be applied to the exhaust gas set point temperature determined in block 306. For example, correction factors may be applied to the base set point temperature based on particulate mass, regeneration time, environmental temperature and time at idle, thus producing a corrected set point temperature. In embodiments, the factors applied in block 308 are optionally included in the process. In other embodiments, no correction factors are applied to the determined set point temperature from block 306. In block 310, the correction value from block 218 is applied to the corrected set point temperature from block 308 to provide a final set point temperature for exhaust gas during regeneration. In block 312, the final set point temperature is used to generate a signal that is communicated from a controller to control a parameter of a regeneration system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling regeneration for an exhaust system of an internal combustion engine, wherein the exhaust system comprises a particulate filter, the method comprising:
    determining a mass flow rate of oxygen received from the internal combustion engine;
    determining a particulate mass within the particulate filter;
    determining a desired particulate burn rate based on the mass flow rate of oxygen and the particulate mass;
    determining a current particulate burn rate at the particulate filter during a regeneration of the particulate filter;
    determining, by a controller comprising a processor coupled to a memory, a correction value based on the desired particulate burn rate and the current particulate burn rate;
    determining a temperature set point for an exhaust gas entering the particulate filter that is independent of a distance between the internal combustion engine and the particulate filter based on the correction value, an engine speed and an engine load; and
    performing a regeneration of the particulate filter based on the determined temperature set point.

2. The method of claim 1, wherein determining the correction value comprises determining a correction ratio based on the desired particulate burn rate and current particulate burn rate.

3. The method of claim 1, comprising determining an exhaust gas set point temperature correction based on a table in the controller using the correction value as an input.

4. The method of claim 1, further comprising communicating a signal, from the controller, to control a parameter for a regeneration system, wherein the parameter is for at least one selected from the group consisting of: a hydrocarbon injector, a heating device and a fuel injector configured to provide fuel post-injection to a cylinder.

5. The method of claim 4, wherein the parameter comprises at least one selected from the group consisting of: a hydrocarbon injector flow rate, a fuel flow rate and a current or voltage to the heating device.

6. The method of claim 1, wherein determining the correction value comprises determining a deviation value based on a difference between the desired particulate burn rate and the current particulate burn rate.

7. The method of claim 6, wherein determining the deviation value is based on the difference between desired and current burn rates, and a determined exhaust gas mass flow.

8. A system comprising:
    a particulate filter coupled to a conduit that receives an exhaust gas from an internal combustion engine; and
    a controller coupled to an oxygen mass flow sensor, the controller comprising a processor coupled to a memory, the controller configured to perform a method, the method comprising:
        determining a mass flow rate of oxygen received from the internal combustion engine;
        determining a particulate mass within the particulate filter;
        determining a desired particulate burn rate based on the mass flow rate of oxygen and the particulate mass;

determining a current particulate burn rate at the particulate filter during a regeneration of the particulate filter;

determining a correction value based on the desired particulate burn rate and the current particulate burn rate;

determining a temperature set point for exhaust gas entering the particulate filter that is independent of a distance between the internal combustion engine and the particulate filter based on the correction value, an engine speed and an engine load; and communicating a signal to control a parameter for a regeneration system to adjust the regeneration based on the determined temperature set point.

9. The system of claim 8, wherein determining the correction value comprises determining a correction ratio based on the desired particulate burn rate and current particulate burn rate.

10. The system of claim 8, comprising determining an exhaust gas set point temperature correction based on a table using the correction value as an input.

11. The system of claim 8, wherein communicating the signal to control the parameter for the regeneration system comprises controlling a parameter for at least one selected from the group consisting of: a hydrocarbon injector, a heating device and a fuel injector configured to provide fuel post-injection to a cylinder.

12. The system of claim 11, wherein the parameter comprises at least one selected from the group consisting of: a hydrocarbon injector flow rate, a fuel flow rate and a current or voltage to the heating device.

13. The system of claim 8, wherein determining the correction value comprises determining a deviation value based on a difference between the desired particulate burn rate and the current particulate burn rate.

14. The system of claim 13, wherein determining the deviation value is based on the difference between desired and current burn rates, and a determined exhaust gas mass flow.

15. A method of regenerating a particulate filter comprising:

flowing an exhaust gas from an internal combustion engine into a particulate filter;

determining a mass flow rate of oxygen received from the internal combustion engine;

determining a particulate mass within the particulate filter;

determining a desired particulate burn rate based on the mass flow rate of oxygen and the particulate mass;

determining a current particulate burn rate at the particulate filter during a regeneration of the particulate filter;

determining, by a controller comprising a processor coupled to a memory, a correction value based on the desired particulate burn rate and the current particulate burn rate;

determining a temperature set point for exhaust gas entering the particulate filter that is independent of a distance between the internal combustion engine and the particulate filter based on the correction value, an engine speed and an engine load; and performing a regeneration of the particulate filter based on the determined temperature set point, wherein the regeneration reduces the particulate mass in the particulate filter.

16. The method of claim 15, wherein determining the correction value comprises determining a correction ratio based on the desired particulate burn rate and current particulate burn rate.

17. The method of claim 15, wherein performing the regeneration of the particulate filter based on the determined temperature set point comprises communicating a signal from the controller to control a parameter for at least one selected from the group consisting of: a hydrocarbon injector, a heating device and a fuel injector configured to provide fuel post-injection to a cylinder.

18. The method of claim 17, wherein the parameter comprises at least one selected from the group consisting of: a hydrocarbon injector flow rate, a fuel flow rate and a current or voltage to the heating device.

19. The method of claim 15, wherein determining the correction value comprises determining a deviation value based on a difference between the desired particulate burn rate and the current particulate burn rate.

20. The method of claim 19, wherein determining the deviation value is based on the difference between desired and current burn rates, and a determined exhaust gas mass flow.

* * * * *